(12) United States Patent
Cugi

(10) Patent No.: US 7,600,015 B2
(45) Date of Patent: Oct. 6, 2009

(54) USER CONFIRMATION IN DATA DOWNLOADING

(75) Inventor: Guido Cugi, Helsinki (FI)

(73) Assignee: Nokia Corporation, Espoo (FI)

( * ) Notice: Subject to any disclaimer, the term of this patent is extended or adjusted under 35 U.S.C. 154(b) by 758 days.

(21) Appl. No.: 10/878,104

(22) Filed: Jun. 28, 2004

(65) Prior Publication Data
US 2006/0031493 A1    Feb. 9, 2006

(51) Int. Cl.
G06F 15/16    (2006.01)
G06F 15/173    (2006.01)

(52) U.S. Cl. .................. 709/224; 709/223; 709/225; 709/229; 709/232

(58) Field of Classification Search .................. 709/223, 709/227, 229, 231; 707/1; 717/171, 173
See application file for complete search history.

(56) References Cited

U.S. PATENT DOCUMENTS

| | | | | |
|---|---|---|---|---|
| 5,586,025 | A * | 12/1996 | Tsuji et al. | 715/207 |
| 7,142,848 | B2 * | 11/2006 | Owen et al. | 709/223 |
| 2002/0038375 | A1 * | 3/2002 | Yamada et al. | 709/231 |
| 2003/0065738 | A1 | 4/2003 | Yang et al. | |
| 2003/0084165 | A1 * | 5/2003 | Kjellberg et al. | 709/227 |
| 2004/0002943 | A1 * | 1/2004 | Merrill et al. | 707/1 |
| 2004/0034853 | A1 | 2/2004 | Gibbons et al. | |
| 2004/0093595 | A1 | 5/2004 | Bilange | 717/171 |
| 2004/0098715 | A1 * | 5/2004 | Aghera et al. | 717/173 |
| 2005/0033852 | A1 * | 2/2005 | Tenhunen | 709/229 |
| 2005/0191991 | A1 * | 9/2005 | Owen et al. | 455/411 |

FOREIGN PATENT DOCUMENTS

| | | |
|---|---|---|
| CN | 1471008 A | 1/2004 |
| EP | 0 924 630 | 6/1999 |
| EP | 1 376 930 | 1/2004 |
| WO | WO 00/28725 | 5/2000 |

OTHER PUBLICATIONS

Dec. 2002, Open Mobile Alliance (OMA-Download-OTA-v1_0-20021219-C), "Generic Content Download Over the Air Specification Version 1.0," Version 19, Dec. 2002, 40 pages.
Feb. 2003, Open Mobile Alliance (OMA-Download-OTA-v1_0-20030221-C), "Generic Content Download Over the Air Specification Version 1.0," Version 21, Feb. 2003, 40 pages.
Open Mobile Alliance, "Generic Content Download Over the Air Specification, Version 1.0", Proposed Version Jun. 20, 2002, OMA-Download-OTA-v1_0-20020620-p, http://www.openmobilealliance.org/documents/copyright.htm, 2002.

* cited by examiner

Primary Examiner—Quang N. Nguyen
(74) Attorney, Agent, or Firm—Hollingsworth & Funk

(57) ABSTRACT

The present invention relates to a method of arranging user confirmation for data downloading. A request is sent for a description of the object to be downloaded. The description of the object is transmitted, the description comprising an information unit indicating whether user confirmation is required. The information unit is checked. The user is prompted for confirmation in response to the information unit indicating that user confirmation is required. The downloading process of the object is continued in response to the information unit indicating that user confirmation is not required.

19 Claims, 3 Drawing Sheets

USER CONFIRMATION IN DATA DOWNLOADING

FIELD OF THE INVENTION

The present invention relates to data downloading, and more particularly to acquiring user confirmation before downloading data.

BACKGROUND OF THE INVENTION

OMA (Open Mobile Alliance) has specified procedures for downloading objects, such as files linked to a Web page over the air (OTA) for mobile devices. The OMA download OTA (DLOTA) specification "Generic Content Download Over The Air Specification", version 1.0, 21 Feb. 2003, describes a method for downloading content over the air from a content provider infrastructure to a client (Download Agent). The OMA Download OTA is also referred to as a user-initiated download protocol as the user is able to authorize each download transaction. After a discovery phase (e.g. via browsing), the download agent (DA) downloads a download descriptor file (DD) that contains information about the upcoming media object. The download agent processes the download descriptor file to determine the device capability (available memory or supported media type, for instance) in order to proceed with the download.

The download descriptor also contains the URI (uniform resource identifier) indicating the location from which the media object is going to be downloaded from. However, before accessing such a URI, the user is prompted with a request whether s/he accepts the download or not. If the user accepts to proceed with the OTA transaction, the download agent downloads the media object.

However, the user confirmation for each OTA transaction limits the deployment scenarios of the OMA OTA downloading. It is not possible to arrange downloading which is transparent for the user. For instance, a game, which the user is playing, may require an update file to be downloaded from a game service provider. The user confirmation is prompted in the screen and the user's ongoing game is interrupted. There may be other cases in which the user confirmation represents an unnecessary step for the download transaction.

BRIEF DESCRIPTION OF THE INVENTION

There is now provided an improved solution for arranging user confirmation for data downloading. This improvement is achieved by methods, a system, data processing devices, a module and computer program products, which are characterized by what is stated in the independent claims. Some embodiments of the invention are disclosed in the dependent claims.

The invention is based on the idea of equipping an object descriptor with information indicating whether user confirmation is required or not. A request is sent for a description of the object to be downloaded. The description of the object is transmitted, the description comprising an information unit indicating whether user confirmation is required. The information unit is checked. The user is prompted for confirmation in response to the information unit indicating that user confirmation is required. The downloading process of the object is continued in response to the information unit indicating that user confirmation is not required. The term 'description' refers generally to any kind of information element describing information associated with at least one downloadable object. The term 'user confirmation' refers generally to an input from the user indicating that the downloading of the object is allowed. An advantage of the method and arrangement of the invention is that the user confirmation can be omitted in certain cases. For instance, the content provider may set the user confirmation information unit and thus control the user interaction. Thus more transparent downloading service may be achieved for instance for automatic update downloading purposes.

BRIEF DESCRIPTION OF THE DRAWINGS

In the following the invention will be described in greater detail by means of preferred embodiments with reference to the accompanying drawings, in which.

DETAILED DESCRIPTION OF THE INVENTION

Some embodiments of the invention are described in the following by means of data downloading with reference to features in the OMA over the air downloading specification. The invention can, however, be applied to a system employing another data downloading technology. For instance, the invention may be applied in WAP and/or HTTP Push based downloading systems.

Figure 1:
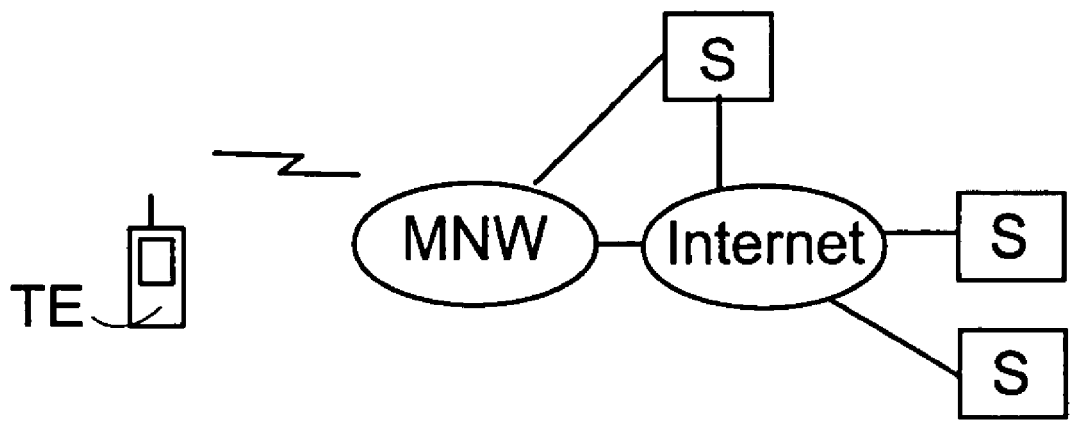
FIG. 1 illustrates a system for downloading objects according to an embodiment of the invention.

FIG. 1 illustrates a networked system, in which data may be downloaded over the air from server S to terminal TE. The terminal TE comprises data downloading client functionality, i.e. any functionality capable of downloading objects from the server S. In the example of FIG. 1, the terminals TE gain network access by a mobile network MNW, however, a network connection may also be arranged via wired networks. The mobile network MNW may be any known or future mobile network, such as a GSM network, a GSM/GPRS network, a 3G network [e.g. a network according to the 3GPP (Third Generation Partnership Project) system], or a WLAN network. The assumption in the following embodiments is that from the point of view of data downloading, the terminal TE serves as the client device and the server S as the server. A network server or a PC typically acts as a server S. A terminal TE is typically a mobile phone, a PC, a laptop computer or a PDA device.

In one typical scenario, the server S is a Web server and communication between the terminal TE and the server S is arranged by HTTP (hypertext transfer protocol) and TCP/IP (transport control protocol/internet protocol). One widely used service supported in many mobile networks is the WAP (Wireless Application Protocol), which in one embodiment is utilized for downloading data to the terminal TE. The WSP layer (Wireless Session Protocol) of the WAP protocol suite is then used to provide transport service for the downloading service layer in the client device TE and the server S. In WAP version 2.0, an HTTP (Hypertext Transfer Protocol) can also be used. In this case, the system comprises at least one WAP gateway and optionally one or more WAP proxy servers. The WAP supports many lower-level transfer techniques, such as circuit or packet-switched data transfer or SMS-based transfer in accordance with the properties of the underlying mobile network MNW. HTTP is used in the following examples but it is noted that the applicability of the invention is not limited to any particular transfer protocol used in the downloading system.

Figure 2:
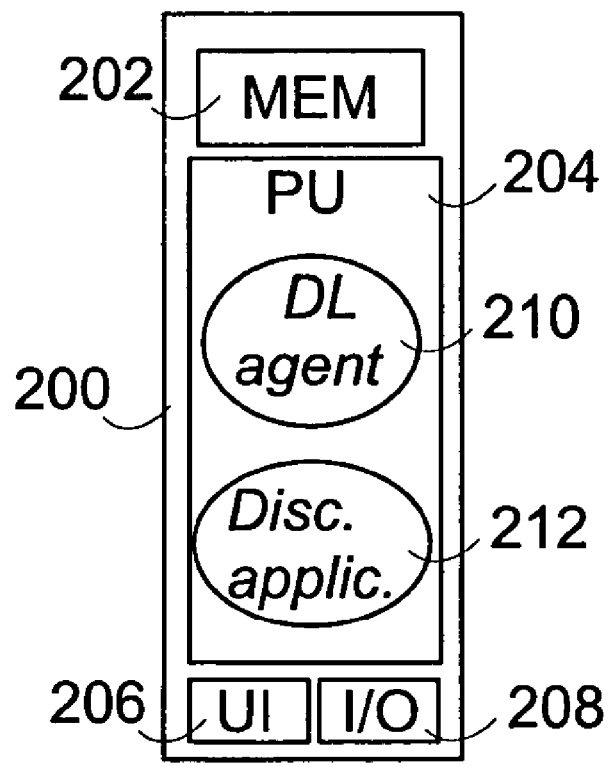
FIG. 2 illustrates a data processing device suitable for functioning as a client for data downloading.

FIG. 2 illustrates a data processing device 200 capable of functioning as a client for data downloading. The data processing device 200 may e.g. be the terminal TE illustrated in FIG. 1. The device 200 comprises a memory (MEM) 202, a user interface (UI) 206, I/O means 208 for arranging data transmission and reception, and a processing unit PU 204 comprising one or more processors. The memory 202 has a non-volatile portion for storing applications controlling the processing unit 204 and other necessary information and a volatile portion for use in processing temporary data. In the present embodiment, the device 200 supports OMA data downloading and comprises a discovery application 212 and a download user agent 210. The discovery application 212 is a user agent in the device that discovers media on behalf of the user. The end user discovers content on the Web by using a Web browser or an application specifically created for a type of content. A picture editor may discover pictures, a melody composer may discover melodies, and an application manager may discover applications on dedicated Web sites. Email and MMS (multimedia messaging system) messages may contain Web addresses to media objects available for downloading. These types of applications are collectively referred to as Discovery Applications. Typically the device 200 comprises a browser, such as an HTML (hypertext markup language) and/or WML (wireless markup language) browser for viewing downloaded HTML/WML pages. If the browser is not part of the discovery application 212, the device 200 further comprises such a browser (not shown in FIG. 2). The download user agent 212 in the device 200 is responsible for downloading a media object described by a download descriptor (DD). It is triggered by the reception or activation of a download descriptor.

The discovery application 212 and the download user agent 210 functionality can be implemented by executing a computer program code stored in the memory MEM of the processing unit 204. Computer program codes executed in the processing unit 204 may cause the data processing device 200 to implement the inventive functions relating to the determination of need for user confirmation, some embodiments of which are illustrated in more detail in connection with FIGS. 3 and 4. In one embodiment, the features related to checking a received user confirmation attribute and to controlling whether the user confirmation is required or not are carried out in the downloading download user agent 210, but they may also be implemented in some other entity in the device 200. A chip unit or some other kind of module for controlling the data processing device 200 may in one embodiment cause the device to perform the inventive functions by software and/or hardware implementation. The module may form a part of the device and could be removable, i.e. it can be inserted into another unit or device. The computer program can be stored on any memory media, such as PC a hard disk or a CD-ROM, from which it can be loaded into the memory 202 of the device 200. The computer program can also be loaded through a network by using a TCP/IP protocol stack, for instance. It is also possible to use hardware solutions or a combination of hardware and software solutions to implement the inventive means.

Figure 3:
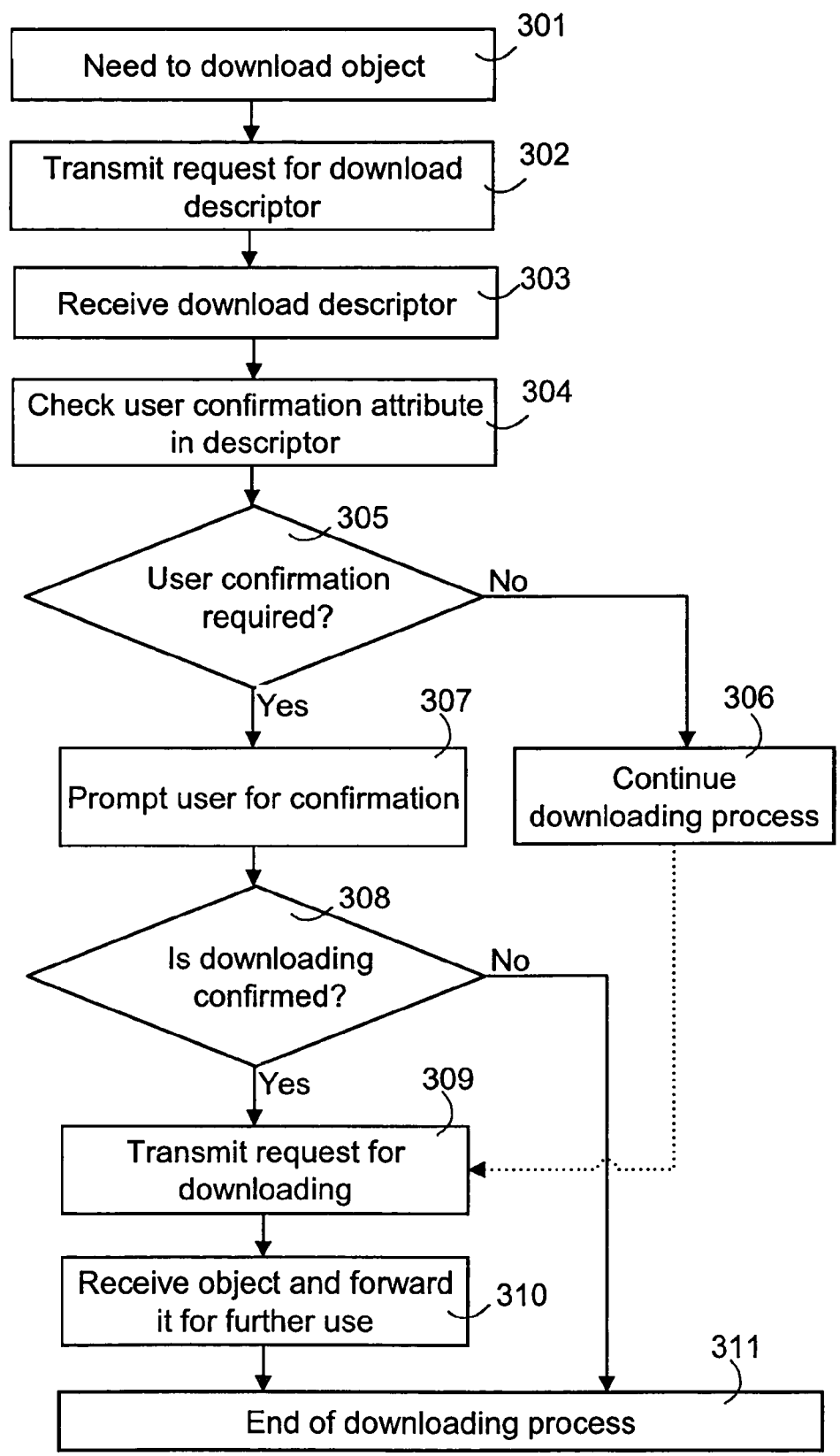
FIG. 3 is a flow diagram illustrating data downloading initiation according to an embodiment of the invention.

FIG. 3 illustrates data downloading initiation according to an embodiment of the invention. In step 301, there is a need to download an object, for instance a data file linked to a browsed Web page. This step is typically entered based on a user command, for instance an input from keypad selecting the link in the Web page. However, this step may also be entered in other kinds of situations where no input is received from the user or where the downloading is caused indirectly by a user input, possibly based on trigger from an external device. In step 302 a request for download descriptor (DD) for the object is sent to the server, in one embodiment by a transceiver in the device 200 for wireless communication. The download descriptor of the object is then received 303 from the server. Ordinary techniques may be used for these steps. In one embodiment, the HTTP protocol is used, whereby an HTTP GET message pointing to the DD file may be sent in step 302 and HTTP RESPONSE including the DD is received in step 303.

In one embodiment, steps 301 to 303 are implemented by the discovery application 212, whereas the following steps 304 to 311 are implemented by the download agent 210. Thus the discovery application 212 may after step 303 initiate launch of the download user agent 210.

In step 304, the user confirmation attribute in the received download descriptor is checked in the descriptor. In one embodiment, the user confirmation attribute is referred to as "enableUserConfirmation" attribute, which the download agent 210 first checks in steps 304 and 305. Step 304 may be carried out as (one) part of the download descriptor, i.e. when checking whether the device 200 is capable of using and/or rendering the object to be downloaded. For more details on other possible attributes in the download descriptor, reference is made to the OMA specification "Generic Content Download Over The Air Specification", version 1.0, Dec. 19, 2002, chapter 6. In another embodiment, steps 304, 305 are not part of the capabilities check but may be carried out if capability check indicates that the object can be used in the device, for instance.

Figure 4:
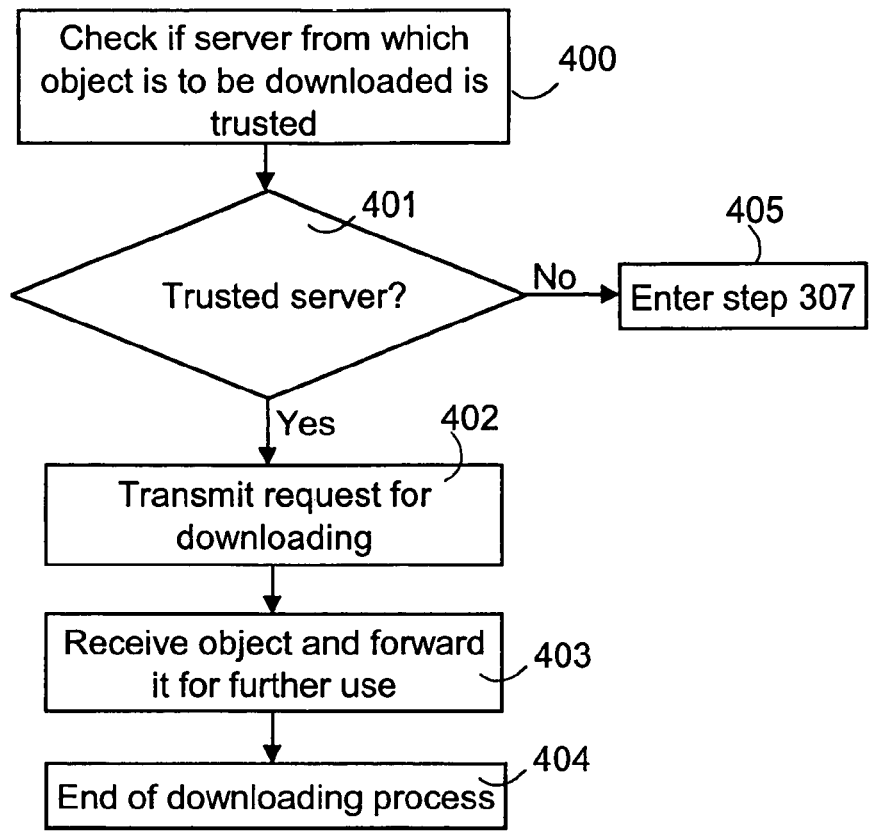
FIG. 4 is a flow diagram illustrating further features relating to data downloading according to an embodiment of the invention.

If on the basis of the check in steps 304 and 305 user confirmation is not required, the downloading process may be continued 306. In step 306, the downloading of the object may be requested (step 309) or further procedures are carried out before transmitting the request, for instance according to FIG. 4 illustrated later.

If on the basis of the check in steps 304 and 305 user confirmation is required, the user is prompted 307 for confirmation for the object downloading. For instance, the contents of the "enableUserConfirmation" attribute may be either TRUE or FALSE. If such an attribute is present and the value is equal to TRUE, then the download agent 210 will prompt 307 the user. The download agent 210 may be configured to perform this also if the attribute is missing, i.e. when the server is not complying with the present method. In the case when the "enableUserConfirmation" attribute comprises a value for FALSE, then the download agent 210 enters step 306.

If on the basis of a user input for step 308 the downloading is confirmed, a request for downloading the object may be transmitted 309. In one embodiment, an HTTP GET request pointing to the URI (uniform resource identifier) from which the object is to be downloaded from (which was indicated in the objectURI attribute of the download descriptor) is transmitted. The download OTA (over the air) transaction may be then carried out as described in the OMA specification "Generic Content Download Over The Air Specification", chapters 5.2.4-5.2.7.

When the object is received in step 310, it may be forwarded for further use to a content handler, for instance to an entity storing it in the memory 202 or an application suitable for opening it for display to the user. After step 310 and after non-confirmation of the downloading in step 308, the downloading process may be ended 311. Once the OTA transaction is concluded, the download user agent 210 may optionally contact other URIs (as defined in the DD) thus to post a downloading transaction result and to redirect the browsing session to some other HTML/WML page.

FIG. 4 illustrates method steps according to an embodiment. In one embodiment, these steps are further procedures carried out in step 306 of FIG. 3. In step 400, it is checked whether the entity from which the object is to be downloaded is trusted. As illustrated, this step may be entered in response to the user confirmation attribute indicating that user confirmation is not required.

The trustworthiness of the server may be implemented in various ways. In one embodiment, a 'white' list of trusted domains is maintained in the device implementing the present method. This white list may be based on usage history, user input and/or input from other entities, for instance the operator of the mobile network MNW managing the subscription for the user. The download user agent 210 may thus first determine the URI and the domain in the URI of the server from which the object is to be downloaded. Then the domain indicated in the URI may be searched from the white list of trusted domains. If the domain is found from the list, the server is trusted and step 402 can be entered, otherwise the server is determined as not trusted. In the latter case the downloading process may either be ended, or the user may be prompted for confirmation for downloading; in one embodiment the procedures 307 to 311 in FIG. 3 are used.

In step 402, a request for downloading the object is transmitted. When the object is received in step 403, it may be forwarded for further use. After step 403 the downloading process may be ended 404. The embodiment illustrated in FIG. 4 has the great advantage that content can be downloaded without user confirmation only from trusted parties. Thus maliciously pushed or hidden download descriptors will not trigger download automatically when they are not originated from a trusted party.

Instead of the list of trusted domains in the data processing device 200, also other checking procedures may be applied in step 400. One or more external devices may be connected to check the trustworthiness of the URI/domain. In one embodiment, the data processing device 200 transmits an identifier of the entity from which the object is to be downloaded (for instance derived from the download descriptor) to a trusted server. The trusted server may maintain centralized information on trustworthiness of domains, for instance a white list similar to the one illustrated above. For instance, company IT security personnel could maintain this trusted server and/or the list in the data processing device 200. Domains including work-related content could be determined as trusted domains, for instance. Another example is that a network operator or a mobile service provider maintains the trusted server. The white list could be maintained by the trusted server and the data processing device 200 would merely retrieve the list or a relevant part of it, and would itself determine whether the domain is trusted or not. Alternatively, the trusted server would decide whether the domain is trusted and give an indication on trustworthiness or an authorization to download from the domain if the trusted server considers the domain as trusted.

It is to be noted that instead of the white list indicating trusted domains, it is alternatively possible to maintain a 'black list' indicating non-trusted or forbidden domains in the data processing device 200 or the trusted server. Further, both of these lists could be used in step 400. It is also possible to choose the applied list among a plurality of lists that do not necessarily have to reside in the same storage and which could be even overlapping. The lists may be prioritised. For instance a list maintained by the IT personnel is associated with the highest priority, a list specified by the user is the next one, and a list by the operator has the lowest priority. Further, an ISP (Internet Service Provider) or the operator could determine certain domains for the black list, for instance domains containing inappropriate content for children on the basis of parent's request. Thus the automatic downloading of content from these domains could be prevented. Further, the modification of the list should be access controlled such that the user cannot modify the list.

The embodiment of FIG. 4 may be applied such that the instead of entering step 307 in step 405, step 311, i.e. no confirmation is requested from the user but the downloading is automatically denied on the basis of the non-authorized server. Thus, the checking steps 400 and 401 may in fact be checking steps for checking the authorization of the user/device to download content from the domain (possibly in addition to the check for trustworthiness of the domain).

Figure 5:
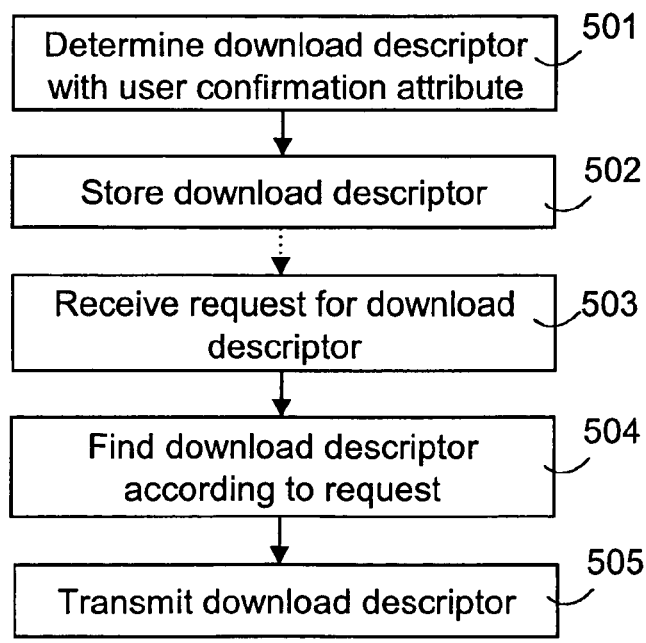
FIG. 5 is a flow diagram illustrating features to be carried out according to an embodiment in a device functioning as the downloading server.

FIG. 5 illustrates features according to an embodiment to be carried out in a device functioning as the downloading server, for instance the server S in FIG. 1. In step 501, a descriptor is determined for at least one downloadable object such that a value for user confirmation attribute is set. For instance, the above-mentioned attribute "enableUserConfirmation" is utilized. The attribute is stored for later usage and associated with at least one object, e.g. a configuration file in step 502. These steps may be carried out when the server is set up or when new content is added to the server, or when existing content is modified in the server, for instance.

When the server receives 503 a request for the download descriptor, in one embodiment based on step 302 in FIG. 3, it finds 504 an appropriate download descriptor on the basis of the request. As already mentioned, in one embodiment the HTTP GET request includes a pointer to the location of the descriptor, on the basis of which the server retrieves the correct descriptor. The descriptor is then sent 505 to the requesting entity, in the present embodiment for the discovery application 212. The above illustrated features 501 to 505 may be carried out in a server serving downloading clients, in one embodiment in accordance with the OMA OTA downloading specification. Such a server may be a WAP or Web server, for instance. The above illustrated inventive features may be implemented by software executed in the processor of the server. It is also possible to use hardware solutions or a combination of hardware and software solutions to implement the inventive means.

One example scenario where the above illustrated features provide clear advantages is the downloading of various updates and confirmation files. In one embodiment at least part of the above features are utilized in plug and play (PnP) configuration scenarios. In the PnP use case, an operator, e.g. the operator of the network MNW in the example of FIG. 1, wants to provide the configuration file (CF) to the user's device 200 (TE in FIG. 1) and at the same time, the operator needs an install/delivery report indicating the result of the OTA transaction. The present downloading features are very well suitable for these requirements. Additionally, the whole OTA transaction should be transparent to the user. According to the present embodiment, the white list includes a "help-portal.com" domain, which could be pre-populated at the manufacturing stage or it could be provisioned using a device management protocol, such as the OMA Device Management. The operator will then make available a device description that includes the "enableUserConfirmation" set to FALSE. In this case, when the agent 210 receives the device description, it will start the download of the configuration file without asking the user for any confirmation.

In another example, the user confirmation attribute could be set to indicate "not required" for digital rights management (DRM) rights objects associated with files comprising copyright protected content. DRM version 2.0 defines a rights object access protocol (ROAP), which can be bound to the OMA OTA downloading. Thereby the right objects may be downloaded to a terminal without the user noticing the downloading or the objects. Thus the user would not have to confirm the transmission of these mandatory files in which he is typically not interested.

It will be obvious to a person skilled in the art that, as the technology advances, the inventive concept can be implemented in various ways. The invention and its embodiments are not limited to the examples described above but may vary within the scope of the claims. Different features may thus be omitted, modified or replaced by equivalents.

The invention claimed is:

1. A computer readable recordable medium storing a computer program, loadable into the memory of a data processing device, for controlling a data processing device by executing a program code included in the computer program in a processor of the data processing device, the computer program comprising:
   a program code portion for causing the data processing device to send a request for a description of an object to be downloaded,
   a program code portion for causing the data processing device to receive the description of the object, the description comprising an information unit indicating whether user confirmation is required,
   a program code portion for causing the data processing device to check the information unit,
   a program code portion for causing the data processing device to check a predefined white list on the basis of an identifier associated with an entity from which the object is to be downloaded,
   a program code portion for causing the data processing device to prompt the user for confirmation in response to the information unit indicating that user confirmation is required or the white list not comprising the identifier, or
   a program code portion for causing the data processing device to transmit a request for downloading and continue the downloading process of the object to be downloaded in response to the information unit indicating that user confirmation is not required and as a response to the white list comprising the identifier.

2. The computer readable recordable medium according to claim 1, wherein the description of the object is a download descriptor of Open Mobile Alliance over the air downloading.

3. A method comprising:
   sending a request for a description of an object to be downloaded,
   receiving the description of the object, the description comprising an information unit indicating whether user confirmation is required,
   checking the information unit,
   checking a predefined white list on the basis of an identifier associated with an entity from which the object is to be downloaded, and
   transmitting a request for downloading and continuing the downloading process of the object as a response to the white list comprising the identifier and in response to the information unit indicating that user confirmation is not required, or prompting the user for confirmation in response to the information unit indicating that user confirmation is required or the white list not comprising the identifier.

4. The method according to claim 3, wherein the method is applied for arranging downloading of the object to a mobile device.

5. The method according to claim 4, wherein the description of the object is a download descriptor of Open Mobile Alliance over the air downloading.

6. The method according to claim 3, wherein the description indicates that a user confirmation is not required.

7. The method according to claim 3, wherein the check of the predefined white list is done by searching for the domain in a uniform resource identifier of the entity from a list of trusted domains.

8. A data processing device comprising:
   a communications interface for sending a request for a description of an object to be downloaded and for receiving the description of the object, the description comprising an information unit indicating whether user confirmation is required, and
   a processing unit for checking the information unit and checking a predefined white list on the basis of an identifier associated with an entity from which the object is to be downloaded, wherein the data processing device is configured to transmit a request for downloading and to continue the downloading process of the object as a response to the white list comprising the identifier and in response to the information unit indicating that user confirmation is not required, or
   the data processing device is configured to prompt the user for confirmation in response to the information unit indicating that user confirmation is required or the white list not comprising the identifier.

9. The data processing device according to claim 8, wherein the data processing device is a wireless mobile device.

10. The data processing device according to claim 9, wherein the data processing device is configured to function as a client for an Open Mobile Alliance over the air downloading system and comprises a discovery application and a downloading user agent, and the data processing device is configured to check the information unit from a received Open Mobile Alliance over the air downloading download descriptor.

11. The data processing device according to claim 8, wherein the description indicates that a user confirmation is not required.

12. The data processing device according to claim 8, wherein the check of the predefined white list is done by searching for the domain in a uniform resource identifier of the entity from a list of trusted domains.

13. A method comprising:
   receiving a description of a downloadable object, the description comprising an information unit indicating that a user confirmation is not required,
   checking the information unit,
   checking a predefined list on the basis of an identifier associated with an entity from which the object is to be downloaded, and
   proceeding downloading process without user confirmation in response to the information unit indicating that user confirmation is not required and the list comprising the identifier.

14. The method according to claim 13, wherein the descriptor is a download descriptor of Open Mobile Alliance over the air downloading.

15. The method according to claim 13, further comprising: prompting the user for confirmation in response to the information unit indicating that user confirmation is not required and the white list not comprising the identifier.

16. An apparatus comprising:
a transceiver for receiving a description of a downloadable object, the description comprising an information unit indicating that a user confirmation is not required, and
a processing unit for checking the information unit, checking a predefined list on the basis of an identifier associated with an entity from which the object is to be downloaded, and proceeding with a downloading process without user confirmation in response to the information unit indicating that user confirmation is not required and the list comprising the identifier.

17. The apparatus according to claim 16, wherein the description is a download descriptor of Open Mobile Alliance over the air downloading.

18. The apparatus according to claim 16, wherein the apparatus is configured to prompt the user for confirmation in response to the information unit indicating that user confirmation is not required and the white list not comprising the identifier.

19. The apparatus according to claim 16, wherein the apparatus is a mobile terminal device.

* * * * *